Figure 1:
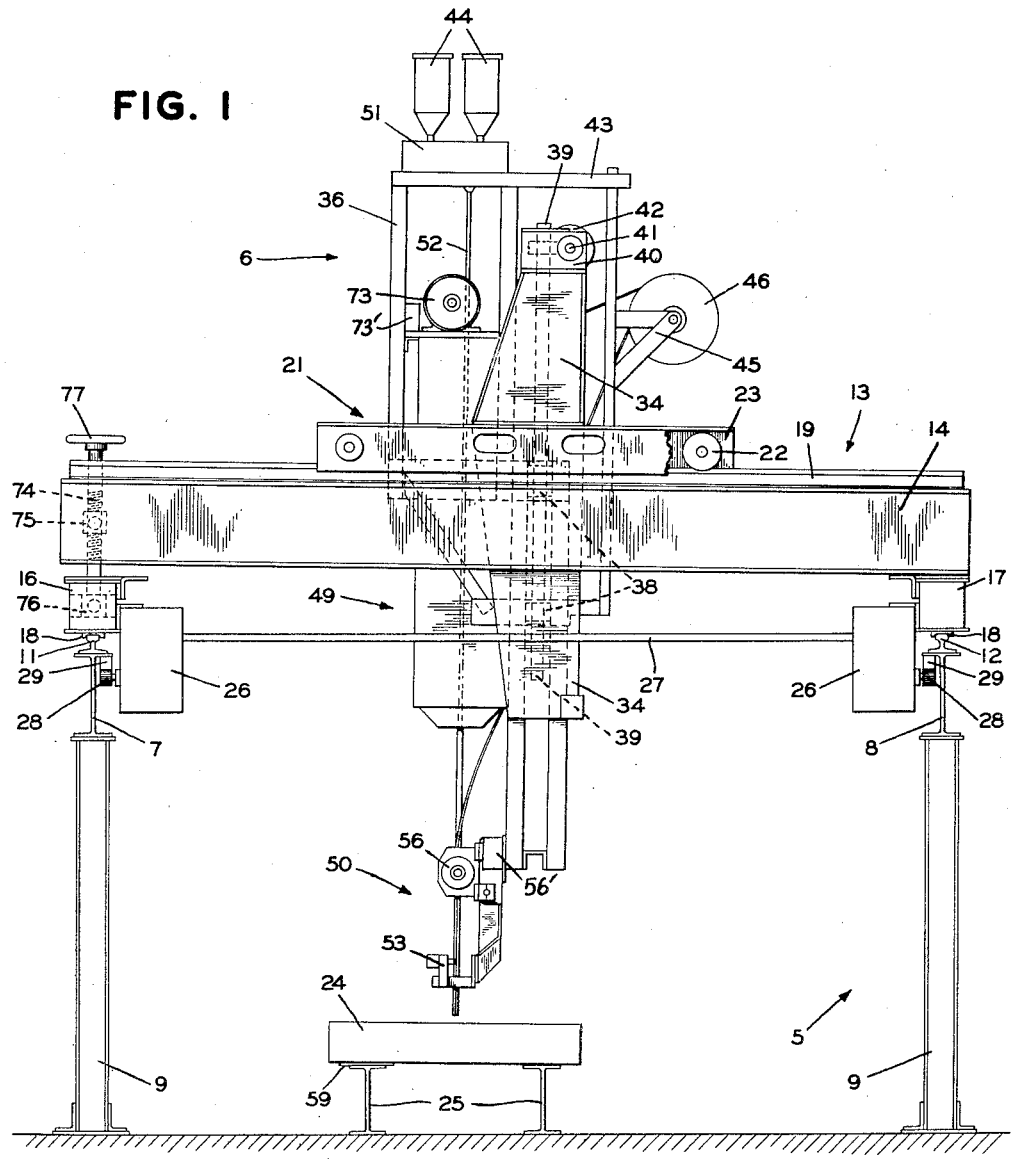

Feb. 27, 1940.   R. K. HOPKINS   2,191,476
WELDING APPARATUS
Filed May 21, 1938   2 Sheets-Sheet 1

INVENTOR
ROBERT K. HOPKINS
BY
Virgil F. Davico
ATTORNEY

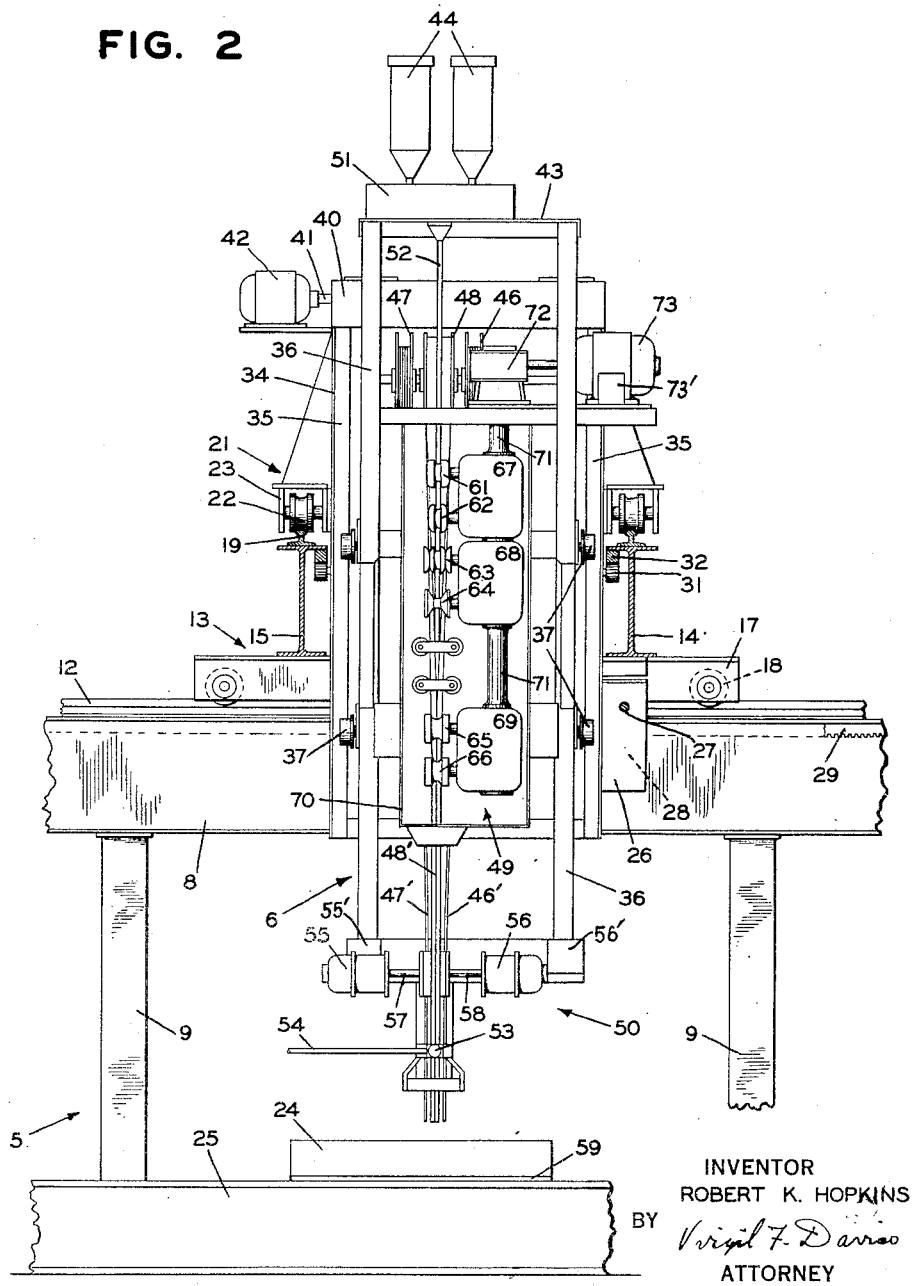

Patented Feb. 27, 1940

2,191,476

UNITED STATES PATENT OFFICE 2,191,476

WELDING APPARATUS

Robert K. Hopkins, New York, N. Y., assignor to The M. W. Kellogg Co., New York, N. Y., a corporation of Delaware Application May 21, 1938, Serial No. 209,195

4 Claims. (Cl. 219—8)

This invention relates, in general, to welding apparatus, and more particularly, to the type of welding apparatus in which a hollow electrode, is employed, through which, metal, adapted to form part of the deposited weld metal, is fed to the gap between the hollow electrode and the workpiece.

In the fabrication of metal vessels, such as the tanks, processing towers, etc., employed in the petroleum refining, chemical and similar processing industries, it has become common practice to provide corrosion resistant linings to minimize corrosive attack by the materials handled. The linings are provided in various ways. Thus, they are applied in sheet form to the finished vessels, or to the plate out of which the vessels are to be fabricated, by spot resistance welding, by arc welding etc.; also, the linings are applied to the plate out of which the vessels are fabricated during the manufacture of the plate.

In my copending applications Serial Nos. 64,496 and 64,497 filed February 18, 1936, is disclosed lined plate, and the manner in which it is manufactured, which has gone into wide use in the fabrication of lined vessels. This lined plate is characterized by the substantially perfect fusion bond that exists throughout between the lining and the base metal. The characteristic bond is obtained by fusing, under the influence of electrical discharge beneath a protective blanket of flux, lining constituents and base metal in the proportions necessary to give a lining of desired analysis. The lining is formed in wide bands of uniform analysis and these bands fused to each other to produce a lining all parts of which are integrally united to each other and to the base. The lining is generally deposited on thick slabs which are worked into plates. This reduces the lining costs and makes the production of large lined plates a comparatively simple matter. In practice, the lining constituents are supplied through a hollow electrode as this facilitates the lining operation and makes it possible to use the constituents in cheap and readily available forms, rather than as refined and expensive electrode metal, and thus, further reduces the lining costs.

It is an object of this invention to provide welding apparatus, capable of carrying out the lining operation, above described, of high metal depositing capacity which can be operated continuously and which is so arranged that the formation of a uniform lining, all parts of which are integrally bonded to each other and to the base metal, is facilitated. The apparatus also being such that it will operate in a predetermined manner with a minimum of handling and adjustment.

Other objects of this invention will be apparent from the following description and claims taken in connection with the accompanying drawings, in which:

Fig. 1 is a side elevation of the welding machine showing the apparatus in position to deposit weld metal upon a workpiece; and Fig. 2 is a front elevation in section, showing the welding head and hollow electrode forming mechanism on a somewhat enlarged scale.

In the drawings, 5 represents a supporting structure on which a welding head, generally indicated at 6, is movably mounted.

The structure 5 comprises a pair of girders 7 and 8 mounted in horizontal, parallel fashion upon vertical supports 9 firmly embedded in the floor or ground and arranged in two parallel rows. The girders 7 and 8 which have been shown in the form of I-beams, have T-rails 11 and 12 respectively extending along their upper surfaces to form an elevated railway of comparatively broad gage.

A bridge 13, comprising a pair of parallel, spaced I-beams 14 and 15, arranged to form a box-frame and having housings 16 and 17 depending from either end thereof, spans the intervening space between the girders 7 and 8 and is adapted for longitudinal movement along the rails 11 and 12 by means of rollers 18 journaled in the housings.

T-rails 19, mounted on the bridge I-beams 14 and 15 form a second elevated railway at right angles to the railway on structure 5. A truck 21 having rollers 22 journaled in housings 23, is mounted on the bridge, and adapted for movement back and forth along the railway.

The combination of movable bridge and movable truck enables the welding head 6 to be moved to all points over the surface of a workpiece 24 placed beneath it on spaced supports 25 between the uprights of the structure 5.

Controlled driving means, such as the driving units 26 which are supported on the sides of the housings 16 and 17 are used to move the bridge 13 along its railway. The driving units 26 are connected together by a shaft 27. A single motor contained in one of the units may be used to operate both, or synchronized motors may be placed in each so that uniform driving may be had at both ends of the bridge. Each unit has a driving gear 28 engaging with a rack 29 extending along the adjacent girders 7 and 8.

Truck 21 is driven along its railway on the bridge 13 by a similar arrangement in which gears 31 engage cooperating rack members 32 extending along the bridge girders 14 and 15. Gears 31 are driven by a variable speed motor, not shown, which is connected through a gear train, also not shown, to the shafts upon which gears 31 are mounted. By means of the drive just mentioned welding head 6 may be progressed in a line over workpiece 24 at the uniform rate necessary to obtain the desired analysis of deposited metal. Suitable devices for moving the bridge and truck by hand-operated means may also be provided.

Secured to truck 21 is a vertical frame 34 which extends above and below the housings 23 and includes spaced vertical guides 35.

Welding head 6 includes a frame 36 which supports the electrode material and its feed mechanism. Rollers 37 mounted on the frame 36 bear on the front and back surfaces of guides 35 to facilitate the up and down movement of the welding head. Secured to the welding head frame at both sides are blocks 38 adapted to receive a pair of vertical screws 39 journaled at their upper ends in housing 40 extending across the top of frame 34. A horizontal shaft 41 extending through the housing 40 and driven by a motor 42 mounted on the frame 34, cooperates with the vertical screws 39 to raise and lower the welding head.

Secured to the top of the frame 36 is a horizontal platform 43 on which are mounted a series of funnel-shaped containers 44 for holding metal, in the granular or other sub-divided form, adapted to supply constituents of the deposited metal.

A rack 45 adapted to carry a plurality of reels on which are wound metal electrodes, is secured on the back of frame 36. In the drawings, three reels 46, 47 and 48 are shown, although fewer or more may be used. Reels 46 and 47 are wound with wire electrode material and reel 48 is wound with metal in wide strip form.

The metal strip from reel 48 is fed into a shaping mechanism 49 shown in Fig. 2, which forms the strip into a hollow electrode 48' and feeds it downwardly toward the work-piece. The hollow electrode 48' passes through a welding nozzle 50 mounted at the bottom of frame 36. Nozzle 50 includes a suitable contact arrangement, not shown, for supplying electric current to the hollow electrode.

The containers 44, which hold the granular metal, have discharge outlets at their lower ends which allow the metal to flow freely into a metering mechanism, generally indicated at 51. The metering mechanism is similar to that described in Patent No. 2,174,175 issued to me on September 26, 1939. A separately controlled metering device is provided for each container so that the various ingredients may be fed at predetermined rates. The metering mechanism discharges all the ingredients into a common stationary discharge duct 52. The discharge duct 52 comprises a long hollow tube, funnel shaped at its upper end and depending vertically from the under side of the platform 43.

The path of the metal strip fed from reel 48 converges to meet the duct 52 immediately above the tube forming mechanism 49 at which point the path of the metal strip is adjacent and parallel to the duct.

The tube forming mechanism bends the metal strip longitudinally around the stationary discharge duct so that when the hollow electrode is formed it will loosely encase the duct 52. The duct extends downward through the formed hollow electrode to a point somewhat above nozzle 50. The metal granules from the storage containers are thus fed downwardly through the duct into the hollow electrode 48' which conveys the metal the remaining distance to the energy discharge gap.

Nozzle 50 is provided with a vibrator 53 adapted to continuously rap the hollow electrode during the welding operation. The vibrator, as shown, is operated by compressed air supplied through a hose 54, although any other suitable mechanism may be used to cause vibration of the electrode. During the deposition of metal, and especially during the deposition of metal beneath a protective blanket of flux, there is a tendency for the end of the hollow electrode to partly seal itself and alter the feed of the granular metal through it. This tendency is sometimes great enough to result in a non-uniform analysis of the deposited metal. The vibrating device 53 keeps the end of the hollow electrode 48' free of molten metal so that the feeding rate is unaltered and a deposit of substantially uniform analysis throughout is easily obtained. Vibrating device 53, furthermore, by constantly removing the molten metal from the end of electrode 48' causes electrode 48' to constantly present a substantially unfused end to the electric current discharge. Thus, the heat of the discharge is more efficiently availed of, as a minimum of it is used in superheating molten metal, and the melting rate is materially increased.

The nozzle assembly 50 also includes a pair of feed motors 55 and 56 supported on the lower end of the welding head frame 36 on opposite sides of the hollow electrode. The motor shafts 57 and 58 respectively, project inwardly toward the hollow electrode and have feed rollers, not shown, on the ends thereof. The wire electrodes 46' and 47', from reels 46 and 47 respectively, pass over the feed rollers and are fed adjacently to the hollow electrode toward the work-piece. The nozzle also supplies electric current through suitable contactors to the wire electrodes. The current may be supplied to the wire electrodes from the same controlled source or from separate controlled sources, and their feed motors 55 and 56 may also be controlled from the same set of controls or from separate controls. At present, I prefer to supply wire electrodes 46' and 47' with current from separate sources and control their feed motors 55 and 56 from separate controls to maintain discharges of predetermined characteristics at each of the wire electrodes as this arrangement provides for a more flexible operation. The control arrangements for motors 55 and 56 may be of any of the forms well known in the art and may be located at any convenient place in the apparatus or elsewhere. For the purposes of this disclosure the control arrangements for feed motors 55 and 56 are indicated at 55' and 56' adjacent their respective motors.

In Fig. 2 the casing surrounding the tube forming mechanism 49 is cut away to clearly show the means for shaping the metal strip into a hollow tube.

The tube shaping is done by a standard form of mechanism including a vertical bank of driven rollers 61, 62, 63, 64, 65 and 66 each having a cooperating pressure roller. The rollers are operated from transmission gear cases 67, 68 and 75

69 connected by a common shaft encased in housing members 71 and connecting at its upper end with a gear reduction unit 72 which is operated by a motor 73, all of which is carried by the welding head frame 36.

Each pair of shaping rollers has a centrally disposed circumferential groove of sufficient size to permit the hollow discharge duct 52 to depend freely between them.

The strip of electrode metal from reel 48 is fed successively between each pair of rollers and is bent gradually into the form of a tube, as shown at 48', encasing the stationary discharge duct 52. The hollow electrode then passes through an opening in the bottom of the cabinet 70 surrounding the tube forming mechanism and is fed downwardly through the nozzle 50, wherein it contacts the electric current supply connection. After the metal strip is shaped into a hollow tube it is fed directly from the tube former through the nozzle toward the workpiece.

Motor 73 operates the tube forming mechanism and thus is the feed motor for hollow electrode 48'. Motor 73 is a variable speed reversible motor, as are motors 55 and 56, and is controlled by control arrangements 73', of the same character as control arrangements 55' and 56', to feed hollow electrode 48' as required to maintain a discharge of predetermined characteristics between its end and the workpiece. It is to be noted, that the tube forming mechanism as arranged does not prevent the back feed of hollow electrode 48' so that in maintaining a discharge of predetermined characteristics motor 73 can back up the hollow electrode when necessary.

In order to more accurately control the penetration into the metal of the workpiece, when the workpiece is being coated or veneered, and thus more accurately control the character and analysis of the coating, it is advantageous to incline the workpiece to the horizontal, as by the use of spacer 59, to prevent the molten metal from flowing ahead of the current discharge gap.

For the deposition of a very short bead of weld metal the automatic electrode feed mechanism will compensate for the fact that the workpiece is angularly disposed relative to the bridge 13 along which the welding head truck 21 is to travel. However, where a band of weld metal is to be deposited along the entire length of a large slab, the welding nozzle 50 will gradually approach and ram the slab, or be so close to the slab that the heat of the electric current discharge will seriously damage the nozzle.

To eliminate this possibility of damage to the apparatus, I provide means for adjusting the apparatus so that the welding head may be made to travel in a line parallel to the surface of the workpiece. In its preferred form, it comprises an elevating mechanism, such as a screw 74 having a cooperating screw element 75 secured to one end of the bridge between the girders 14 and 15.

The lower end of screw 74 is freely rotatable in a block 76 mounted in the housing 16, and the upper end is provided with a handwheel 77 by which the end of the bridge may be raised or lowered relative to the housing 16.

After the workpiece 24 is suitably positioned at its proper angle beneath the welding head, the screw 74 is operated to raise the end of the bridge unit until its tracks are substantially parallel to the surface of the workpiece.

It is contemplated that where it is deemed necessary or expedient a screw may be placed also at the opposite end of the bridge or, that other means may be employed to effect the same result; that is, to tilt the bridge longitudinally to conform to the angle of the surface along which the band of weld is to be deposited.

An alternative method of causing the welding head nozzle 50 to travel over the workpiece at a uniform distance therefrom is to coordinate the forward feed of the truck along the bridge with the vertical feed of the welding head along its runway.

I claim:

1. In apparatus adapted to deposit metal upon a workpiece by the discharge of electric current through a gap between an electrode and the workpiece, in combination, a source of electrode material in strip form, means for forming said material into a one-piece hollow electrode of substantially closed cross-section, said forming means including means for feeding said hollow electrode toward the workpiece, means for feeding fusible metal at a controlled rate independent of the rate of feed of said hollow electrode into said hollow electrode for conveyance by the latter to the gap, and an electric current supply connection contacting said hollow electrode between said gap and said forming means.

2. In apparatus adapted to deposit metal upon a workpiece by the discharge of electric current through a gap between an electrode and the workpiece, in combination, a source of electrode material in strip form, a plurality of rollers adapted to engage the material, said rollers when driven in one direction forming said material into a hollow electrode of substantially closed cross-section and feeding the electrode toward the workpiece and when driven in the opposite direction returning a substantial length of the material to said source, reversible means for driving said rollers, an electric current supply connection contacting said hollow electrode between said rollers and its discharge end, and means controlling the operation of said reversible means to maintain a discharge of predetermined character.

3. In apparatus adapted to deposit metal upon a workpiece by the discharge of electric current through a gap between an electrode and the workpiece, in combination, a source of electrode material in strip form, a plurality of rollers adapted to engage the material, said rollers when driven in one direction forming said material into a hollow electrode of substantially closed cross-section and feeding the electrode toward the workpiece and when driven in the opposite direction returning a substantial length of the material to said source, reversible means for driving said rollers, an electric current supply connection contacting said hollow electrode between said rollers and its discharge end, means for feeding fusible metal at a controlled rate independent of the rate of feed of said hollow electrode into said hollow electrode for conveyance by the latter to the gap, and means controlling the operation of said reversible means to maintain the rate of fusion of said hollow electrode substantially constant.

4. In apparatus adapted to deposit metal upon a workpiece by the discharge of electric current through a gap between an electrode and the workpiece, in combination, a source of electrode material in strip form, a plurality of opposed rollers engaging said material therebetween and feeding the same toward the workpiece, said rollers forming the material into a one-piece hollow electrode of substantially closed cross-section, an electric current supply connection contacting said hollow electrode between said rollers and its discharge end, and means including a stationary discharge duct for feeding fusible metal at a controlled rate independent of the rate of feed of the hollow electrode into said hollow electrode for conveyance by the latter to the gap, said discharge duct being disposed between said rollers and depending within the electrode for a portion of its length.

ROBERT K. HOPKINS.